(12) United States Patent
Baeuerle et al.

(10) Patent No.: US 6,857,400 B2
(45) Date of Patent: Feb. 22, 2005

(54) METHOD FOR CONTROLLING THE COMPRESSION RATIO OF AN INTERNAL COMBUSTION ENGINE

(75) Inventors: Michael Baeuerle, Ditzingen (DE); Klaus Ries-Mueller, Bad Rappenau (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/363,003

(22) PCT Filed: Aug. 29, 2001

(86) PCT No.: PCT/DE01/03213

§ 371 (c)(1),
(2), (4) Date: Sep. 10, 2003

(87) PCT Pub. No.: WO02/18757

PCT Pub. Date: Mar. 7, 2002

(65) Prior Publication Data

US 2004/0025818 A1 Feb. 12, 2004

(30) Foreign Application Priority Data

Aug. 29, 2000 (DE) .......................................... 100 42 381

(51) Int. Cl.⁷ ............................................... F02B 57/04
(52) U.S. Cl. .................................. 123/48 R; 123/78 R
(58) Field of Search ............................. 123/48 R–48 D, 123/78 R–78 F

(56) References Cited

U.S. PATENT DOCUMENTS 4,619,236 A * 10/1986 Okada et al. ............ 123/406.3
4,860,711 A * 8/1989 Morikawa ................. 123/48 D
5,255,637 A * 10/1993 Schechter ................. 123/48 R
6,708,654 B2 * 3/2004 Cowans .................... 123/48 R

FOREIGN PATENT DOCUMENTS

| DE | 40 27 625 | 11/1991 |
| DE | 40 28 594 | 3/1992 |
| DE | 196 10 277 | 10/1996 |
| DE | 197 03 948 | 6/1998 |
| DE | 198 44 200 | 6/1999 |
| DE | 198 45 965 | 4/2000 |

\* cited by examiner

*Primary Examiner*—Marguerite J. McMahon
(74) *Attorney, Agent, or Firm*—Kenyon & Kenyon

(57) ABSTRACT

A method for controlling the compression ratio $\epsilon$ in a supercharged combustion engine. The latter is provided with a control device in which a maximum final compression temperature $T_{2,max}$ is ascertained, and, within the framework of a precontrol, an optimum efficiency compression ratio $\epsilon_{opt}$ is ascertained. The knock limit is determined from the compression ratio $\epsilon$, to which it corresponds, and which is ascertained from the precontrol. As a function of the efficiency curve in the characteristics map $\eta=f$, a further change occurs in compression ratio $\gamma$ or a setting back of the change in compression ratio $\epsilon$. The values learned for $\epsilon$ and the ignition angle as a function of the operating point are permanently stored in a characteristics map to which the engine control has access.

10 Claims, 2 Drawing Sheets

METHOD FOR CONTROLLING THE COMPRESSION RATIO OF AN INTERNAL COMBUSTION ENGINE

FIELD OF THE INVENTION

The present invention relates to a method for controlling the compression ratio $\epsilon$ in a supercharged combustion engine.

BACKGROUND INFORMATION

Supercharged gasoline combustion engines may be operated using variable compression systems. The compression ratio, denoted by $\epsilon$, may be varied in the range between 8 and 14. It may be desirable to operate the individual cylinders of a gasoline combustion engine using maximum available compression in the lower part throttle range, and using minimum available compression in close to full throttle operating ranges, so as to limit the tendency to knocking that is pronounced there.

A mechanical solution for attaining a variable compression in an Otto engine is discussed in German Patent Application No. 198 44 200. The crankshaft drive suggested there for the variable compression of a reciprocating combustion engine or reciprocating compressor is made up of a connecting rod having an adjustable position of the small end bearing. The length of the connecting rod, i.e., the distance between the axes of the small end bearing and the piston pin bore bearing may be changed by the use of two or more hydraulic chambers. For this purpose, the hydraulic chambers are configured in different but compensating dimensions, whereby bores running inside the crankshaft and the operating piston and used for setting the compression and possible lubrication are provided with lubricating oil, one of the two hydraulic chambers of a pair of chambers being able, in principle, to be replaced by a return spring. Between the hydraulic chambers mentioned, a double-acting operating piston is accommodated, which, in turn, accommodates the small end bearing.

A further device for changing the compression of a reciprocating combustion engine is discussed in German Patent Application No. 197 03 948. This device for changing the compression in a reciprocating combustion engine includes a crankshaft rigidly supported in the engine housing, a connecting rod supported on a crank of the crankshaft, and a piston supported on the connecting rod and able to move up and down inside a cylinder fixed in the engine housing. Also included is an eccentric sleeve which is supported on the crank by its cylindrical inner surface, and is supported on the connecting rod by its outer surface which is eccentric with respect to the inner surface. The effective length of the connecting rod may be changed by the rotation of the sleeve relative to the connecting rod. The eccentric sleeve is configured to include at least two locking recesses, a locking member being mounted on the connecting rod, which, when moving in one direction, engages with one locking recess of the sleeve, and when moving in another direction engages with the other locking recess of the sleeve, the one locked rotary position of the sleeve generally corresponding to the maximum effective length of the connecting rod and the other locked rotary position of the sleeve generally corresponding to the minimum effective length of the connecting rod.

The compression ratio of Otto engines has a decisive influence on the operating behavior of supercharged Otto engines. In the operation of Otto engines having high loads, lowering the compression ratio is the usual manner of controlling the engine's tendency to knock. At too high a rating of the compression ratio, full throttle operation is limited by knocking, and the ignition angle has to be set back. Setting back the ignition angle results in a loss of efficiency, which in turn limits the attainable full throttle mean pressures. The late combustion phase relations connected with setting back the ignition angle result in high exhaust gas temperatures. In turn, reducing the exhaust gas temperature, which is required with regard to component part protection, results in a great mixture enrichment, which, however leads to additional consumption difficulties.

SUMMARY

An example method according to the present invention follows the path of first changing the compression stepwise within the framework of precontrol, and then determining, from this change of the compression ratio $\epsilon$, the newly set knock limit. In the engine control of supercharged combustion engines, the relationship between the efficiency $\eta$, the ignition angle ZW and the compression ratio $\epsilon$ is stored as a characteristics map or as a characteristics curve relationship in such a manner that it may be accessed.

If one knows the efficiency $\eta$, then for each compression ratio $\epsilon$ ascertained by the precontrol, resulting from the maximum permissible final compression temperature $T_{2,max}$, the knock limit may be determined. Now, from the efficiency, which is known for each compression ratio $\epsilon$, it may be decided whether further adaptive compression change is necessary or whether the change in compression ratio has to be set back.

Using this example method, a control of compression ratio $\epsilon$ may be performed which takes into consideration all the operating parameters of a supercharged combustion engine, as a function of the intake air temperature, the temperature of the combustion engine, as well as the octane number of the fuel used, whether premium or regular gasoline. The parameters ignition angle (ZW) and compression ratio $\epsilon$ may be set for optimum efficiency, those different gas temperatures occurring within the polytropic relationship being particularly taken into consideration which have a very strong influence on the knocking behavior and which offer considerable efficiency potential. Using the final compression temperature $T_{2,max}$, one may optimally map the actually prevailing thermodynamic relationships with regard to the efficiency at the knock limit of a supercharged combustion engine.

In the case of an exhaust gas temperature control being present in the engine management, the temperature value $T_{2,max}$ ascertained for the final compression temperature may be corrected in such a manner that a lower supercharging ratio $\epsilon$ sets in. The lower compression ratio $\epsilon$, resulting from the limitation of $T_{2,max}$, leads to a knock limit that sets in earlier with respect to the ignition angle, and thus to a lower exhaust gas temperature.

DETAILED DESCRIPTION

Figure 1:
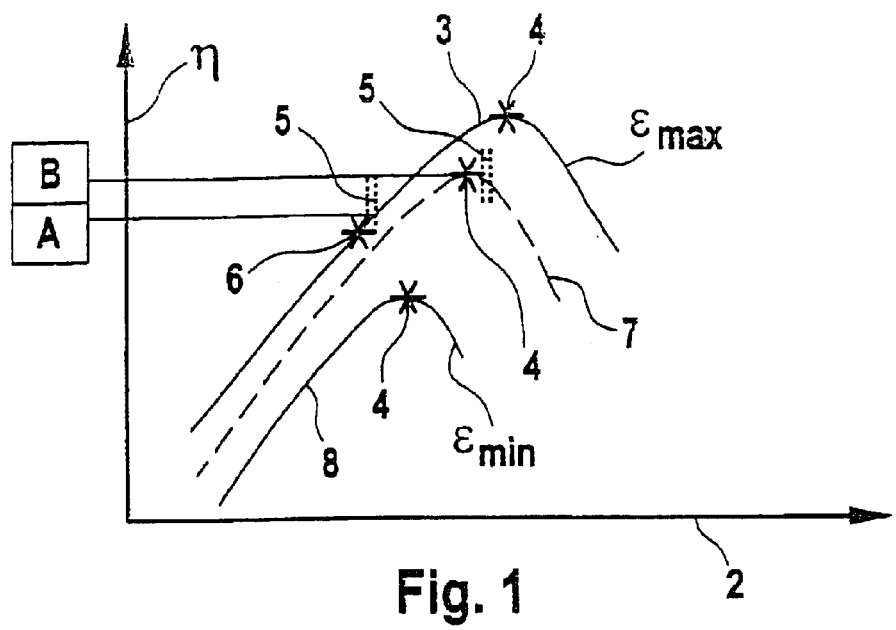
FIG. 1 shows the characteristic curve relationship between efficiency $\eta$, ignition angle ZW and compression ratio $\epsilon$.

In FIG. 1 the characteristic curve relationship between efficiency η, ignition angle ZW and compression ratio ε shows up more clearly. Reference numeral 2 denotes the ignition angle axis. The drawing according to FIG. 1 makes clear the characteristic curve pattern of three characteristic curves for compression ratios ε that are each different. Reference numeral 3 marks the pattern of maximum compression ratio $\epsilon_{max}$.

The knock limit setting in during the course of curve path 3, which characterizes maximum compression ratio $\epsilon_{max}$, is identified by reference numeral 5. Accordingly, the operating point of a combustion engine whose compression ratio is $\epsilon_{max}$ lies at a value marked by reference numeral 6 in the diagram according to FIG. 1, which corresponds to operating point A. When the combustion engine is operated at compression ratio $\epsilon_{max}$ it may not be operated at its optimum efficiency η, since the latter may not be reached due to the prematurely attained knock limit 5.

In the case of a setting back of the compression ratio ε of the combustion engine according to the curve path shown as a broken line in FIG. 1, marked with reference numeral 7, knock limit 5 lies before optimal operational point 4 marked by letter B. A combustion engine operated using compression ratio ε according to curve path pattern 7 may be operated using a higher efficiency η in operating point B, compared to operating point A, in which a combustion engine may be operated which, on account of knock limit 5, must be operated at a lower operating point 6.

Finally, in the drawing according to FIG. 1, a further curve path 8 is taken up, which characterizes the pattern of the minimum compression ratio $\epsilon_{min}$ of a combustion engine. Since the knock limit does not matter for this compression ratio $\epsilon_{min}$, this combustion engine may be operated at the optimal operating point 4 which is equivalent to the vertex of the curve path. The efficiency of a combustion engine operated in this manner, whose compression ratio is ε submin, is far below the combustion engine efficiencies η which may be attained in operating points A and B.

Figure 2:
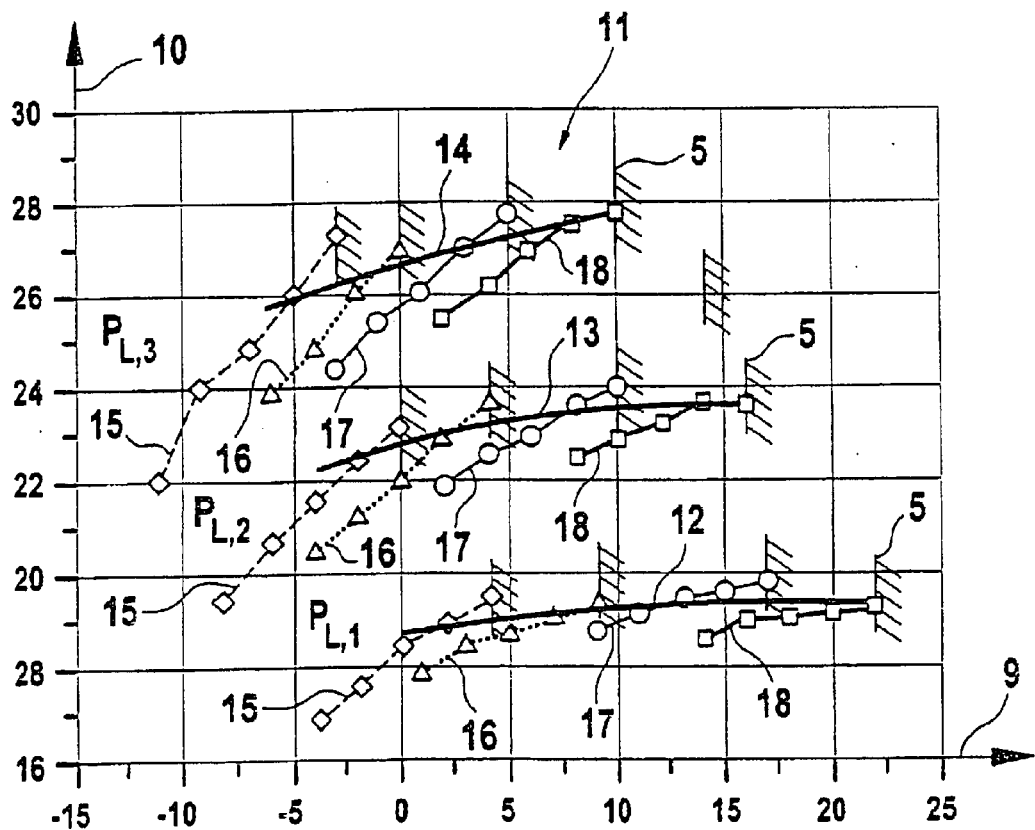
FIG. 2 shows the influence of the compression ratio $\epsilon$ on the full throttle operating behavior.

From the drawing as in FIG. 2 the influence of compression ratio ε on the full throttle operating behavior of a supercharged combustion engine may be read off.

The diagram as in FIG. 2 shows the pattern of the full-throttle mean pressure 10 plotted against the ignition angle, with reference to the top dead center of the cylinders of the supercharged combustion engine. Three different full-throttle mean pressure curves are shown marked by reference numeral 11, each for different supercharging pressures. Reference numeral 12 shows the curve of the full-throttle mean pressure in the case of a supercharging pressure $P_{L,1}$ setting in at below 2 bar. Reference numerals 15, 16, 17 and 18 characterize in each case different compression ratios in rising sequence. The diagram as in FIG. 2 shows, under reference numeral 5, in each case, the knock limit setting in for the various compression ratios 15, 16, 17 and 18.

Reference numeral 13 characterizes the pattern of the full-throttle mean pressure for a supercharging pressure $p_{12}$ of above 2 bar, four differently selected compression ratios ε having been set, denoted by reference numerals 15, 16, 17 and 18, analogously to the representation of full-throttle mean pressure 12.

Above the curve setting in of full throttle mean pressure 13 the curve of full throttle mean pressure p for a further increased supercharging pressure $P_{L,3}$ is shown, which is higher still than the selected supercharging pressure denoted as $P_{L,2}$.

Full throttle mean pressure curves 12, 13, 14, positioned comparatively to one another, were each recorded at constant rotational speed and constant air ratio. These curves show that in the case of too high a rating of compression ratio ε, and, for example, characterized by reference numerals 17 and 18, the full throttle operation of a supercharged combustion engine is limited by the knock limit. Therefore, as a remedy, the ignition angle is set back, so that ignition will occur before the upper dead center is reached. However, this results in a loss of efficiency, which in turn limits the attainable full throttle mean pressures. The combustion phase relations, setting in late due to the early ignition, lead to high exhaust gas temperatures, which, in turn, make necessary a required exhaust gas temperature reduction by mixture enrichment, for reasons of protecting component parts. The mixture enrichment, in turn, leads to consumption difficulties, since, in order to limit the temperature, more fuel has to be used in preparing the mixture.

Figure 3:
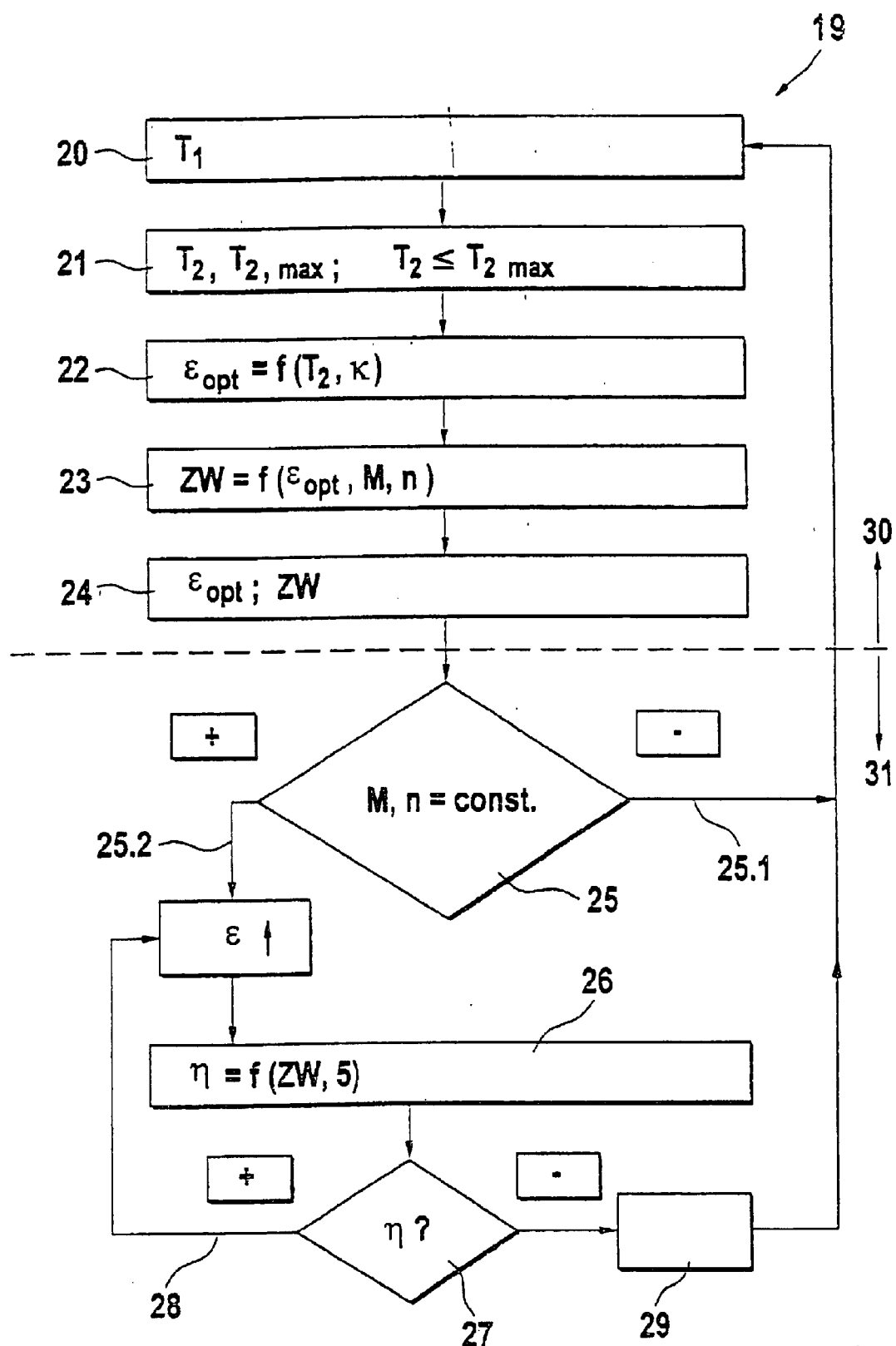
FIG. 3 shows the sequence of a compression ratio change in the engine control within the framework of a precontrol as well as an adaptive part.

FIG. 3 shows more clearly the example method steps that may be undertaken for changing compression ratio ε using an engine control, the engine control being able to be subdivided into a precontrol part 30 and an adaptive part 31.

It is the task of the engine control to set the parameters compression ratio ε and ignition angle ZW for optimal efficiency, on the basis of current data load (M), rotational speed (n), intake air temperature and supercharging air temperature, engine temperature as well as for knocking sensitivity. It may be important, within the framework of the engine control, to determine the knock limit setting in due to the octane number of the fuel used, whether it is premium or regular gasoline.

Within a precontrol 30 of flow diagram 19 for an engine control, the two controlled variables compression ratio ε and ignition angle ZW are calculated, which are optimized by an adaptive unit 31 in connection with the knock control for the consideration of the fuel influences.

In the engine control, the temperature of the supercharging air in the combustion chamber at the inlet end $T_1$ is ascertained by a model calculation as a function of the engine temperature, the intake air temperature and the air mass flow setting in. From the compression ratio ε, the final compression temperature $T_2$ may be determined as follows, according to the polytropic equation:

$$T_2 = T_1 \cdot \epsilon^{(\kappa'-1)}$$

In flow diagram 19 as in FIG. 3, the determination of temperature $T_1$ at the inlet end occurs at 20. This final compression temperature $T_2$ determines, together with the octane number of the fuel used, the knock limit of the engine, and is well suited for calculating the optimal compression. This represents a state variable which comes closest to the energetic unburned gas state and is caused by the self-ignition temperature of the unburned gas during the combustion. In the engine control, a limiting value for maximally permissible final compression temperature $T_{2,max}$ may be stored in the form of a load(M)/rotational speed(n)-dependent characteristics map. This characteristic map shows the thermodynamic relationships actually setting in with respect to efficiency ε at knock limit 5 of a combustion engine. If temperature $T_2$ setting in according to the polytropic equation is held to less than maximum permissible compression temperature $T_{2,max}$ (reference numeral 21 in flow diagram 19), then from that may be determined the greatest possible, i.e., optimally efficient compression, using the boundary condition $T_2 = T_{2,max}$, according to the following equation:

$$\varepsilon = (T_{2,\max} / T_1)^{\left(\frac{1}{\kappa - 1}\right)}$$

where k is the polytropic exponent.

Using the assumption of a constant polytropic exponent (κ=1.3), this relationship may be stored in a form in a characteristics map as a function of temperatures $T_1$ and $T_{2,max}$, and will be accessible to the engine control at any time. The greatest possible, i.e., optimally effective compression is ascertained in flow diagram 19 at 22.

If desired, an exhaust gas regulation may also be present in the engine control, which, when the maximum exhaust gas temperature is exceeded, corrects the boundary value $T_{2,max}$ in such a manner that a lower compression $\epsilon$ comes about. When a lower compression $\epsilon$ comes about, an earlier knock limit with reference to the ignition angle is attained. An earlier ignition angle comes about. An earlier ignition angle leads to lower exhaust gas temperatures. Thereby, the requirement on maintaining a stoichiometric air relationship in the air ratio under all operating conditions of the supercharged combustion engine is taken into account ($\lambda$=1).

After the determination of optimal compression ratio $\epsilon_{opt}$, at (step) 23 in flow diagram 19 as in FIG. 3, the calculation is made of the associated ignition angle ZW as a function of load (M), rotational speed (n) and optimal compression ratio $\epsilon_{opt}$. For this, one may optionally interpolate several load/rotational speed ignition angle characteristics maps of different compression values $\epsilon$.

After the ascertainment of the associated ignition angle (ZW), this as well as the calculated optimal compression ratio $\epsilon_{opt}$, ascertained from the polytropic equation under the assumption of a constant polytropic exponent $\kappa$=1.3, are set by the engine control as controlled variables in the combustion engine.

The calculations described above may be performed within the framework of precontrol 30 of the engine control, after which there follow adaptive operations 31.

After a stable operating point of the combustion engine is achieved, a check is made to see whether adjustment condition 25, i.e., the approximating stabilizing of load/and rotational speed in the supercharged combustion engine is approximately satisfied.

If this is not so, then, via 25.1, there is a return to flow diagram 19 for the purpose of calculating mixture temperature $T_1$ at the start of compression at 20.

On the other hand, if it is so, branching occurs from adjustment step 25 via 25.2 to an adjustment step 26, at which a decision is made concerning a further adaptive change of compression ratio $\epsilon$. After the adaptive change of compression ratio $\epsilon$ via 25.2, a new calculation is made of the efficiency $\eta$ that is setting in, as a function of ignition angle (ZW) and knock limit 5 now yielded at 26. The efficiency taking into consideration the ignition angle and the new knock limit setting in after the change of compression ratio $\epsilon$ at 25.2 occur after stabilization of the newly setting in work point of the supercharged combustion engine. After this calculating routine 26 there follows an interrogation of efficiency 11 at 27. If efficiency $\eta$ has increased, branching back occurs via branching 28 to the adaptive increase of compression ratio $\epsilon$ at 25.2, in order to be able, in a further run through of the routine 25.2, 26, 27, to be able to bring about a further efficiency increase in the supercharged combustion engine.

If, on the other hand, a lower efficiency has set in, the system branches to 29, where a setting back of the change of compression ratio $\epsilon$ at 25.2 is initiated. For this, at the beginning of flow diagram 19 at reference numeral 20, branching back occurs for the calculation of mixture temperature $T_1$ at the beginning of compression.

Using the example method according to the present invention, different external conditions such as intake air temperature as well as engine temperature may be taken into account, just as may different fuel qualities, which, with respect to their octane number, may indeed have an influence on knock limit 5 setting in. The example method combines the variable compression with the influencing of compression ratio $\epsilon$ of the knock control going on, and brings about an ignition angle resetting as a function thereof. Different temperatures, which have a strong influence on the knocking behavior, are used for the variation of compression ratio $\epsilon$, so that a considerable improvement of the efficiency relationship $T_1$ may be set. In the part throttle range, supercharged combustion engines may be operated using the method according to the present invention at maximum disposable compression ratio $\epsilon$, and in the full throttle range, compression ratio $\epsilon$ may be correspondingly set back for the limitation of the tendency to knock.

What is claimed is:

1. A method for controlling a compression ratio in a supercharged combustion engine including a control unit in which an optimum efficiency compression ratio $\epsilon_{opt}$ is ascertained from a maximum final compression temperature $T_{2,max}$ within a framework of a precontrol, the method comprising:
    ascertaining a knock limit from a compression ratio $\epsilon$ ascertained in the precontrol;
    adapting one of the compression ratio $\epsilon$ and a set-back of a compression change, as a function of an efficiency curve in a characteristics map 7=f ($\epsilon$, ZW), wher ZW is an ignition angle;
    ascertaining values for the compression ratio and the ignition angle ZW as a function of an operating point, the values being permanently stored in the characteristics map.

2. The method of claim 1, wherein the knock limit is ascertained from a final compression temperature $T_2 < T_{2,max}$ and an octane number of a fuel.

3. The method of claim 1, wherein, within the framework of the precontrol, another compression ratio is determined under a boundary condition $T_2 < T_{2,max}$ from an equation:

$$\varepsilon = (T_{2,\max}/T_1)^{\left(\frac{1}{\kappa-1}\right)}$$

as the optimum efficiency compression ratio, where $T_1$ is a compression temperature, and k is a constant.

4. The method of claim 1, further comprising:
    ascertaining, within the precontrol, an ignition angle corresponding to the optimum efficiency compression ratio $\epsilon_{opt}$ as a function of a load, a rotational speed and the optimum efficiency compression ratio $\epsilon_{opt}$.

5. The method of claim 4, wherein within the precontrol, for determination of the ignition angle, a plurality of load/rotational speed ignition angle characteristics maps for different compression ratios are interpolated.

6. The method of claim 1, wherein an adaptation condition of the adapting step is given by an approximate stabilizing of a load torque and a rotational speed.

7. The method of claim 1, wherein after undertaking change in the compression ratio $\epsilon$ by adjusting a mixture volume, an ignition angle efficiency is calculated taking the knock limit into consideration.

8. The method of claim 1, further comprising:
    after stabilization of a working point of the supercharged combustion engine at the optimum efficiency compression ratio and the iginition angle, ascertaining an efficiency $\eta$ of the supercharged combustion engine.

9. The method of claim 8, further comprising:
    one of adjusting of the compression ratio to higher values and setting back of a change of the compression ratio, as a function of the efficiency of the supercharged combustion engine.

10. The method of claim 3, further comprising:
    establishing a boundary value $T_{2,max}$ so that a lower compression ratio sets in upon input and maintenance of an air ratio of $\lambda$=1.

* * * * *